(12) United States Patent
Mensch et al.

(10) Patent No.: US 12,473,758 B2
(45) Date of Patent: Nov. 18, 2025

(54) DECORATIVE ELEMENT WITH AN ACTUATION MODE, VEHICLE ELEMENT AND VEHICLE

(71) Applicant: Witte Automotive GmbH, Velbert (DE)

(72) Inventors: Reinaldo Mensch, Wuppertal (DE); Ralf Höhn, Velbert (DE)

(73) Assignee: Witte Automotive GmbH, Velbert (DE)

( * ) Notice: Subject to any disclaimer, the term of this patent is extended or adjusted under 35 U.S.C. 154(b) by 326 days.

(21) Appl. No.: 18/148,473

(22) Filed: Dec. 30, 2022

(65) Prior Publication Data
US 2023/0212890 A1    Jul. 6, 2023

(30) Foreign Application Priority Data

Dec. 30, 2021  (DE) ...................... 10 2021 215 096.0
Mar. 22, 2022  (DE) ...................... 10 2022 202 809.0

(51) Int. Cl.
*E05B 81/64*       (2014.01)
*B60R 25/01*       (2013.01)
(Continued)

(52) U.S. Cl.
CPC .............. *E05B 81/64* (2013.01); *B60R 25/01* (2013.01); *B60R 25/21* (2013.01); *B60R 13/04* (2013.01)

(58) Field of Classification Search
CPC .......... E05B 81/64; E05B 81/50; E05B 85/10; E05B 81/76; E05B 81/04; E05B 81/56; E05B 83/16; E05B 83/18; E05B 83/24; E05B 83/40; E05B 85/08; B60R 25/01; B60R 25/21; B60R 13/04; B60R 13/005
See application file for complete search history.

(56) References Cited

U.S. PATENT DOCUMENTS

| 12,142,449 B2 * | 11/2024 | Buschmann ............. G05G 5/05 |
| 2007/0285184 A1 * | 12/2007 | Eyckmans ......... H03H 9/02574 |
| | | 257/E43.004 |

(Continued)

FOREIGN PATENT DOCUMENTS

| CN | 104675268 A | 6/2015 |
| DE | 102 18 915 A1 | 11/2003 |

(Continued)

OTHER PUBLICATIONS

German Patent and Trademark Office First Office Action; dated Nov. 9, 2022.

(Continued)

*Primary Examiner* — Nay Tun
(74) *Attorney, Agent, or Firm* — Marshall & Melhorn, LLC

(57) ABSTRACT

A decorative element with an actuation module for an electronic lock system where the actuation module may have at least an outer actuation element and an interior actuation sensor for triggering a switching function and an electronic evaluation unit that is connected to the actuation sensor. The decorative element may form the actuation element and the decorative element moves elastically when actuated, in particular to its actuation position. Also provided is a movable vehicle element with such a decorative element and a vehicle with at least one such movable vehicle element.

10 Claims, 2 Drawing Sheets

(51) Int. Cl.
*B60R 25/21* (2013.01)
*B60R 13/04* (2006.01)

(56) References Cited

U.S. PATENT DOCUMENTS

| | | | | |
|---|---|---|---|---|
| 2012/0020045 | A1* | 1/2012 | Tanase | H03K 17/9625 |
| | | | | 200/600 |
| 2013/0249808 | A1* | 9/2013 | Silk | G06F 3/044 |
| | | | | 345/173 |
| 2014/0367675 | A1 | 12/2014 | Sanborn et al. | |
| 2019/0152433 | A1* | 5/2019 | Cumbo | G07C 9/00714 |
| 2022/0328261 | A1* | 10/2022 | Buschmann | H01H 3/161 |
| 2022/0328263 | A1* | 10/2022 | Buschmann | G05G 5/05 |
| 2022/0336162 | A1* | 10/2022 | Boczek | H03K 17/955 |

FOREIGN PATENT DOCUMENTS

| | | |
|---|---|---|
| DE | 10 2018 128 539 A1 | 6/2019 |
| FR | 3081487 A1 | 11/2019 |
| WO | 2021043664 A1 | 3/2021 |
| WO | 2021043666 A1 | 3/2021 |

OTHER PUBLICATIONS

China National Intellectual Property Administration, Office Action in Application No. CN202211723438.3, dated Dec. 20, 2024, 18 pages.
European Patent Office, Extended European Search Report for Patent Application No. EP22217251.2, dated Jun. 14, 2023, 9 pages.

* cited by examiner

DECORATIVE ELEMENT WITH AN ACTUATION MODE, VEHICLE ELEMENT AND VEHICLE

BACKGROUND

The invention concerns a decorative element, in particular an emblem, with an actuation module for a movable vehicle element, in particular for a sliding door, tailgate, or hood/trunk of a vehicle. The invention further concerns a movable vehicle element with such a decorative element and a vehicle with at least one such movable vehicle element.

Actuation modules in the form of handle modules are known, for example, on vehicle doors, tailgates, or hoods. They are generally equipped with a handle element that can be swung outward in order to open the vehicle door, tailgate, or hood. Handle modules of this type can also include electronic sensor modules for unlocking the door. DE 10 2018 128 539 A1 discloses a system comprising multiple capacitive sensors for a touch or gesture pad in combination with a mechanical switch for providing access to a vehicle. DE 102 18 915 A1 discloses a company emblem as the manual handle with a pressure pin.

SUMMARY

The invention is intended to provide a decorative element with an actuation module that is compact in design and permits intuitive operation. In addition, it includes a movable vehicle element with such a decorative element and a vehicle with such a movable vehicle element.

The invention's goal is achieved by means of a decorative element with an actuation module, a movable vehicle element and, a vehicle having the features as described in the patent claims herein.

The decorative element according to the invention, in particular on a movable vehicle element such as a tailgate or hood, comprises an actuation module for an electronic locking system on the vehicle element or on a vehicle, wherein the actuation module comprises at least one actuation element that in particular moves when it is actuated, for example when pressure is applied, and an actuation sensor that triggers a switching function, for example the release, in particular the opening or unlocking, of an electronic lock, wherein the decorative element forms the actuation element and the decorative element moves elastically when actuated, especially to its actuation position. This elastic movement is understood to include reversible movement in particular.

Actuation by means of applied pressure permits actuation even in cold temperatures and with ice in the area of the actuation element configured as a decorative element. There can also be separate emergency opening.

The actuation element is configured as an outer actuation element that is accessible by a user from the outside. The decorative element itself acting as an actuation element can be configured as a movable element that moves reversibly when the decorative element is actuated, in particular to its actuation position.

The actuation sensor is configured in particular as an internally placed actuation sensor. An internally placed actuation sensor is understood to be in particular a fully integrated sensor that is, in particular, completely housed or enclosed to the outside. This allows for safe and easy mechanical actuation, with fewer actuation problems. In addition, the actuation module's electronics, such as the actuation sensor and evaluation unit, are protected against environmental factors such as rain, snow, and dust, which further prevents false readings.

The actuation element and/or actuation sensor can both be configured for large-area operation. The actuation element in particular has a larger actuation area than a sensor surface of the actuation sensor. Such a large-area actuation range allows for intuitive and improved actuation and requires no fine motor skills of the user.

The outside actuation element is in particular connected to the actuation sensor, so as to transfer the elastic movement of the outside actuation element to an actuation stroke (also called switch movement or switch stroke) of the actuation sensor. Subsequent to the applied actuation stroke, when a preset lowest actuation stroke is reached or exceeded, the actuation sensor generates a triggering signal or switching signal that releases, in particular opens or unlatches, a lock.

The intended advantages of the invention in particular include having such a decorative element, which is configured as an integrated actuation module, allow for intuitive opening of the moved vehicle element, such as a tailgate or hood. When the decorative element, for example an emblem on the movable vehicle element, is pressed, the actuation sensor recognizes a command to open and triggers a switching function to open an electronic locking system, for example. In this respect, because the decorative element is acting as an actuation element, it can be pressed at any spot to trigger the actuation and initiate a control signal, such as an opening or locking signal, for example. The control signal is generated by the actuation sensor through a connection between the actuation element and the actuation sensor. This allows for intuitive actuation and operation. The decorative element here is configured to be flexible, in particular elastically movable, so that minimal actuation travel of a few tenths of a millimeter, in particular 0.01 mm or greater, in particular in a range from 0.01 mm to 0.7 mm, in particular from 0.01 mm to 0.5 mm or 0.01 mm to 0.2 mm, can be detected by the actuation sensor.

The decorative element can be, for example, a flexible, in particular elastic, material, in particular a foam, silicone, thermoplastic elastomer, and/or thermoplastic polyurethane.

In one embodiment, at least between the decorative element and at least one component of the actuation sensor there is a flexible element that moves when the decorative element is actuated, in particular to its actuation position. Here at least one material in the flexible element is a foam, silicone, thermoplastic elastomer, and/or thermoplastic polyurethane. The flexible element allows for intuitive actuation, in particular opening, of the electronic locking system. The flexible element between the decorative element acting as an actuation element and the actuation sensor allows for minimal actuation travel of a few tenths of a millimeter, in particular 0.01 mm or greater, in particular in a range from 0.01 mm to 0.7 mm, in particular from 0.01 mm to 0.5 mm or 0.01 mm to 0.2 mm, that can be detected as actuation travel by the actuation sensor.

In one possible embodiment, the flexible element is located between the actuation element and actuation sensor. With the flexible element placed in this way, actuation of the actuation element can be detected by the actuation sensor. In particular, with the flexible element located between the actuation element and the actuation sensor, minimal actuation travel of the actuation element can be detected.

In another embodiment, the flexible element is located in a fastening element or between the actuation element and the fastening element. This allows for optimal detection when the actuation element is actuated, to open the locking system, for example.

In one embodiment, the flexible element is located in the fastening element, in a protruding mounting base, for example. The flexible element allows the respective fastening element to be attached to a vehicle body surface of the vehicle element such that it can move, in particular elastically or by spring action. In particular, the decorative element detects a main body, from which the fastening element protrudes in the direction of the outer vehicle surface. Here the respective fastening element can be configured, for example, as a base element with inner threads, into which a screw can be inserted.

In one embodiment of the decorative element, the actuation sensor is configured as a force-activated capacitive actuation sensor. In particular, the actuation sensor is configured as a so-called MOC (metal-over-cap) module, in which internal metal sensor components, in particular electrodes, of the, in particular, capacitive actuation sensor are enclosed from the outside in. Here the actuation sensor is configured to trigger a switching function, such as unlocking and opening the electronic lock system, for example.

In another embodiment, the actuation sensor has a number of sensor elements that can detect minimal actuation travel or initiation travel of 0.01 mm or more, maximum of 0.6 mm, of the actuation element as the actuation stroke of the actuation sensor, in order to activate the vehicle's lock system, for example.

In particular, the actuation sensor has at least two sensor elements that are separate from and opposite to each other. The sensor elements are enclosed from the outside, for example enclosed from the outside by the decorative element. Here the two sensor elements are configured such that the electrical field that evaluates the actuation stroke extends between them. Based on one embodiment of the actuation sensor, a first sensor element with a circuit board can form a measurement electrode and a second sensor element forms the opposing electrode or vice versa.

In another embodiment, the respective sensor element comprises an assigned sensor housing part and both sensor elements can be moved relative to each other by the sensor housing parts. The sensor housing parts are therefore used in particular for movable mounting of the sensor elements.

In one possible embodiment, another flexible element is placed between the two sensor housing parts. The additional flexible element can include, for example, a flexible, in particular elastic, material, in particular a foam, silicone, thermoplastic elastomer, and/or thermoplastic polyurethane. All additional flexible elements between the two sensor housing parts have the same shape, size, dimensions, and/or the same material. In particular, the additional flexible element provides an actuation stroke of a few tenths of a millimeter, for example, and the additional flexible element can simultaneously perform a connecting function, repositioning function, and sealing function between the sensor housing parts.

The invention further concerns a movable vehicle element, for example a hood or tailgate, with a decorative element that comprises an actuation module for an electronic lock system of the vehicle element or of a vehicle. The actuation module comprises at least one actuation element and one actuation sensor for triggering a switching function, wherein the decorative element forms the actuation element and wherein at least between the decorative element and the actuation sensor there is a flexible element that moves when the decorative element is actuated, in particular to its actuation position. Here the actuation element and the actuation sensor can be placed together on one side of the movable vehicle element or separated on opposite sides of the movable vehicle element.

The decorative element, which is placed on or partially in the movable vehicle element, is configured as an integrated actuation module and allows for intuitive opening of the moved vehicle element, such as a tailgate or hood. When the decorative element, for example an emblem on the movable vehicle element, is pressed, the actuation sensor recognizes a command to open and triggers a switching function to open an electronic locking system, for example. This makes it possible to open the movable vehicle element, for example the tailgate or hood/trunk of a vehicle.

The invention also concerns a vehicle with at least one such vehicle element that has a decorative element with an actuation module for an electronic lock system. Here the decorative element can be an emblem, for example.

DESCRIPTION OF THE FIGURES

Embodiments of the invention are explained in more detail below, with reference to the accompanying figures.

The same items are marked with the same references in all figures.

DETAILED DESCRIPTION

Figure 1:
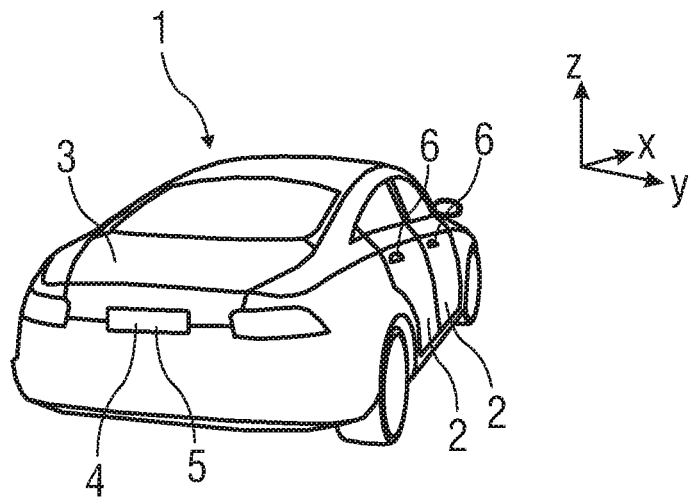
FIG. 1 shows a perspective representation of a vehicle with a decorative element on the outside that has an integrated actuation module.

FIG. 1 schematically shows a vehicle 1. The vehicle 1 has multiple electronically switchable areas on its outside. For example, the vehicle 1 has a decorative element 4, in particular an emblem, in the area of a door 2 or a tailgate 3. An actuation module 5 for an electronic lock system, in particular for unlocking, locking, opening, and/or closing the electronic lock system, in particular an electronic lock, on the door 2 or the tailgate 3, is integrated into the decorative element 4. In particular, the actuation module 5 is used to detect at least one manual actuation by the hand of a user.

The actuation module 5 is located in the decorative element 4 on the door 2 or the tailgate 3, in particular in or on the interior side of the decorative element 4.

The actuation module 5 allows for simple and easy activation of a corresponding function of the vehicle 1, such as opening or closing the door 2, unlocking or locking a tailgate lock or hood lock, or opening or closing the tailgate 3. Here the vehicle 1 can be equipped with multiple actuation modules 5. The actuation module 5 can be located in the decorative element(s) 4, such as in an emblem on the vehicle 1, as well as in a handle 6.

Figure 2:
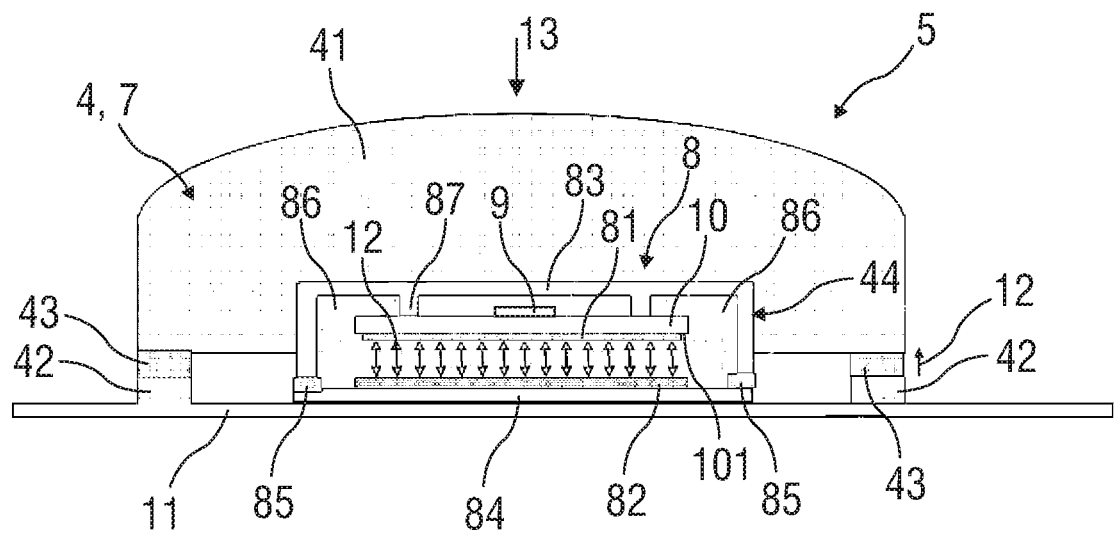
FIG. 2 shows a schematic representation of a first exemplary embodiment of a decorative element with integrated actuation module.

FIG. 2 shows a schematic representation of a first exemplary embodiment of a decorative element 4 with integrated actuation module 5.

The actuation module 5 comprises at least one actuation element 7 and one, in particular capacitive, actuation sensor 8, in particular a force-activated capacitive actuation sensor 8, for triggering a switching function, such as unlocking and opening the electronic lock system, for example.

The actuation element 7 is configured, for example, as an element that can be moved by an actuation, for example the application of pressure, and that forms the decorative element 4, such as an emblem. The decorative element 4 moves elastically when it is actuated, in particular to its actuation position. This elastic movement is understood to include reversible movement in particular.

The actuation element 7 is configured as an outer actuation element that is accessible by a user from the outside. The decorative element 4 itself acting as an actuation element 7 can therefore be configured as a movable element that moves reversibly when the decorative element 4 is actuated, in particular to its actuation position.

The actuation sensor 8 is configured in particular as an internally placed actuation sensor 8. An internally placed actuation sensor 8 is understood to be in particular a fully integrated sensor that is, in particular, completely housed or enclosed to the outside.

The actuation element 7 and/or actuation sensor 8 can both be configured as large-area elements, in particular strip-shaped, plate-shaped, disk-shaped, circular, or similar. The actuation element 7 in particular has a larger outer actuation area than an inner sensor surface of the actuation sensor 8.

The outer actuation element 7, configured as an outer decorative element 4, is in particular connected to the actuation sensor 8, so as to transfer the elastic movement of the outside actuation element 7 to an actuation stroke 12 (also called switch movement or switch stroke) of the actuation sensor 8. Subsequent to the applied actuation stroke 12, when a preset lowest actuation stroke is reached or exceeded, the actuation sensor 8 generates a triggering signal or switching signal that releases, in particular opens or unlatches, a lock.

The actuation module 5 also comprises an electronic evaluation unit 9 (also called an electronics unit).

The electronic evaluation unit 9 is connected to the capacitive actuation sensor 8 at least by means of signal technology. Here, by means of the electronic evaluation unit 9 and based on a detected capacity change of the capacitive actuation sensor 8, an actuation stroke of the actuation element 7, in particular an actuation stroke generated by pressure of the user's hand on the actuation module 5, is detected. The actuation stroke of the actuation element 7, based on the connection status of actuation element 7 and actuation sensor 8, represents the actuation stroke 12 that can be detected by the actuation sensor 8.

The capacitive actuation sensor 8 and the electronic evaluation unit 9 are configured in such a way that, at a detected actuation stroke of less than 0.8 mm, in particular in a range of 0.01 mm to 0.6 mm, for example of 0.01 mm to 0.4 mm, a triggering signal is generated that initiates a function of the vehicle 1, in particular a switching function of the electronic lock systems, for example a triggering signal to unlock and open the electronic lock system. In particular, the capacitive actuation sensor 8 detects the actuation stroke 12 (also called switch movement or switch stroke) resulting from the elastic movement or actuation travel of the outer actuation element 7 and can transfer that to the electronic evaluation unit 9. Subsequent to the applied actuation stroke 12, when a preset lowest actuation stroke is reached or exceeded, the actuation sensor 8 and/or evaluation unit 9 respectively generate(s) a triggering signal or switching signal for a lock, on the door 2 and/or tailgate 3, for example, that releases, in particular opens or unlatches, the lock.

In particular, the capacitive actuation sensor 8 and the electronic evaluation unit 9 are configured in such a way that a minimum actuation stroke or triggering stroke 0.01 mm or greater, in particular in a range from 0.01 mm to 0.8 mm, in particular from 0.01 mm to 0.6 mm or 0.01 mm to 0.4 mm, can be detected.

For example, measurement values for the capacity change are detected at such a resolution and processed by the electronic evaluation unit 9, which can detect a minimum actuation stroke or triggering stroke of 0.01 mm or greater, with a maximum of 0.6 mm.

Here the electronic evaluation unit 9 comprises an analog-digital converter and a microprocessor. The electronic evaluation unit 9 is part of a circuit board 10 that is installed in the actuation module 5.

The decorative element 4 forms the actuation element 7 of the actuation module 5. Here the decorative element 4 is designed to move elastically when it is actuated. In particular, the decorative element 4 is designed to move reversibly and elastically. In other words: The decorative element 4 goes from an initial position (not-actuated position) outward and then after actuation returns by itself to the initial position. For example, the decorative element consists of a flexible, in particular elastic, material such as, in particular, a foam, silicon, thermoplastic elastomer, and/or thermoplastic polyurethane.

In the first embodiment example, the capacitive actuation sensor 8 is configured as a so-called MOC (metal-over-cap) module. The actuation module 5, in particular the actuation sensor 8, is at least partially integrated into the decorative element 4.

The decorative element 4 is installed on the vehicle body surface 11 of the movable vehicle element, in particular a door 2 or the tailgate 3. In this first embodiment example, the decorative element 4 with the partially integrated actuation module 5 is installed and fastened to one side of the movable vehicle element, in particular on the vehicle body surface 11. In particular, the decorative element 4 acting as an actuation element 7 and the actuation sensor 8 are installed and fastened to one side of the movable vehicle element.

For example, the decorative element 4 includes a main body 41. Fastening elements 42 protrude from the main body 41 in the direction of the vehicle body surface 11. The fastening elements 42 are, for example, base elements with inner threads, into which screws can be inserted.

The decorative element 4, in particular the respective fastening element 42, is movable, in particular movable elastically or with spring action, with respect to the vehicle body surface 11. Here the decorative element 4 is made of an elastic material.

Alternatively or additionally, for example, flexible elements 43 are installed in the fastening elements 42. Each flexible element 43 is flush or configured as a thin layer. Each flexible element 43 contains, for example, a flexible, in particular elastic, material such as, in particular, a foam, silicon, thermoplastic elastomer, and/or thermoplastic polyurethane. The flexible elements 43 of all fastening elements 42 have the same shape, size, dimensions, and/or material.

In this embodiment example, the actuation sensor 8 is partially integrated into the decorative element 4 acting as an actuation element 7 and installed partially between the decorative element 4 and the vehicle body surface 11.

The actuation sensor 8 has at least one first sensor element 81 and one second sensor element 82 that are separate from and opposite to each other. Each of the sensor elements 81 and 82 contains a matching sensor housing part 83 or 84. The two sensor elements 81 and 82 are held by the two sensor housing parts 83 and 84 so that they can move relative to each other. In addition, for example, another flexible element 85 is placed between the two sensor housing parts 83 and 84.

The additional flexible element 85 contains, for example, a flexible, in particular elastic, material such as, in particular, a foam, silicon, thermoplastic elastomer, and/or thermoplastic polyurethane. All additional flexible elements 85 between the two sensor housing parts 83 and 84 have the same shape, size, dimensions, and/or the same material.

In addition, the flexible elements 43 of the decorative element 4 and the additional flexible elements 85 of the actuation sensor 8 have the same shape, size, dimensions, and/or the same material.

The first sensor element 81 is partially integrated into the decorative element 4. For example, the respective sensor housing part 83 is installed in a recess 44 of the decorative element 4. The recess 44 is open in the direction of the vehicle body surface 11. The decorative element 4 is made of a hard material, in particular a hard plastic material, that can be lacquered or chromed. The sensor elements 81, 82 are in particular enclosed on the outside, for example by means of the sensor housing part 83 and the decorative element 4 (shown in FIG. 2), or on the inside, for example by means of the sensor housing part 84 (shown in FIG. 3), in particular away from the vehicle body surface 11. For example, the sensor elements 81, 82 are enclosed on the outside by the decorative element 4, covered in particular by foam, metal, and/or lacquer.

In addition, the first sensor element 81 can be located on an upper surface 101 of the circuit board 10 facing in the direction of the second sensor element 82.

The second sensor element 82 is located with its sensor housing part 84 on the vehicle body surface 11. The second sensor element 82 is connected to the first sensor element 81 through the additional flexible element 85 and can be integrated as a module into the decorative element 4, in particular placed and fastened in the recess 44.

Alternatively, the second sensor element 82 can be located on the upper surface 101 of the circuit board 10 and thereby integrated into the decorative element 4, and the first sensor element 81 can be located on the vehicle body surface 11. One of the two sensor elements 81 or 82 is a movable sensor element 81 or 82, and the other of the two sensor elements 82 or 81 is a fixed, in particular stationary, sensor element 82 or 81.

The interior space 86 formed between the sensor housing parts 83 and 84 can be hollow or can be filled with an, in particular elastic, foam material. In addition, stops 87 can be provided on the inner sides of the respective sensor housing parts 83 and/or 84.

Both the decorative element 4 and the first sensor element 81 integrated into it are designed to provide an actuation stroke 12 of, in particular, a few tenths of a millimeter, by means of the decorative element 4 itself and/or through the flexible elements 43 and/or the additional flexible elements 85.

An electrical field extends between the two sensor elements 81 and 82 and is used to evaluate the actuation stroke 12. Depending upon the configuration of the actuation sensor 8, the first sensor element 81 can form a measurement electrode with the circuit board 10 and the second sensor element 82 can form an opposing electrode or vice versa.

The actuation sensor 8 is enclosed by the sensor housing parts 83 and 84 and protected against outside environmental factors such as moisture, rain, and/or splashed water. The additional flexible element 85 can simultaneously perform a connecting function, repositioning function, and sealing function between the sensor housing parts 83 and 84.

In addition, the decorative element 4 can cover the actuation sensor 8 located inside and enclose it from the outside by means of the fastening element 42.

The decorative element 4 itself, the flexible elements 43 of the decorative element 4, and or the additional flexible elements 85 of the actuation sensor 8 also provide a repositioning function such that, after the end of an actuation movement of the decorative element 4 acting as the actuation element 7 to an actuation position, the decorative element 4 returns by itself to an initial position or resting position.

The decorative element 4 can be configured with the installed actuation sensor 8 as a preinstalled assembly module or as a separately integrated component. In other words: The decorative element 4 is installed together with the preinstalled actuation sensor 8 on the vehicle body surface 11.

In another simplified embodiment of the invention, the sensor housing parts 83 and 84 can be omitted. In this embodiment (not shown), the actuation sensor 8 with its sensor elements 81, 82 is integrated directly into the decorative element 4. Instead of a capacitive sensor, an inductive sensor can also be used to trigger a switching function.

The actuation sensor 8 is exposed to force, for example pressure force on the outside of the decorative element 4 shown by arrow 13. If an actuation stroke 12 resulting from the force exceeds a preset threshold value of a few tenths of a millimeter, it is identified as an opening command and the door lock unlocks safely. Unlocking is triggered, for example, by pressing on the outer side of the decorative element 4 in the direction of the vehicle body surface 11, so that the decorative element 4 acting as an actuation element 7 is moved or pressed in the direction of the vehicle body surface 11. With a large enough actuation stroke 12 of the decorative element 4, it pulls the movable first sensor element 81, in particular a spring plate, metal layer, or in particular a copper layer on the circuit board 10, with it and presses the latter likewise in the direction of the vehicle body surface 11, whereby the distance to the second sensor element 82, in particular a metal layer, for example a copper layer on the inside of the sensor housing part 84, and with it the electrical field extending between them is changed, and when the present threshold value is exceeded, an opening signal is generated and, for example, the door lock unlocks or a door movement is stopped.

This change in the electrical field is detected by the electronic evaluation unit 9. When the preset threshold value is exceeded, the electronic evaluation unit 9 generates a corresponding control signal to open or unlock the electronic lock system on the door 2 or tailgate 3.

The decorative element 4 fully covers the actuation sensor 8. The decorative element 4 and the actuation sensor 8 are configured and related to each other in such a way that the decorative element 4 can be actuated from any position. In other words: The actuation sensor 8 recognizes any actuation of the decorative element 4 regardless of its initial position. Depending on the detected actuation stroke 12, a corresponding opening signal is then generated by the electronic evaluation unit 9. Here the decorative element 4 acting as an actuation element 7 is configured and placed in such a way that it can only be moved in one direction, in particular linearly, for example in the actuation direction shown by arrow 13.

When assembling the actuation module 5, in particular depending on individual part tolerances, the distance between the first sensor element 81 and the second sensor element 82 can vary. This possible resulting distance can be "nullified," i.e., eliminated as much as possible, by measuring the distance of the actuation stroke originating form that point.

Figure 3:
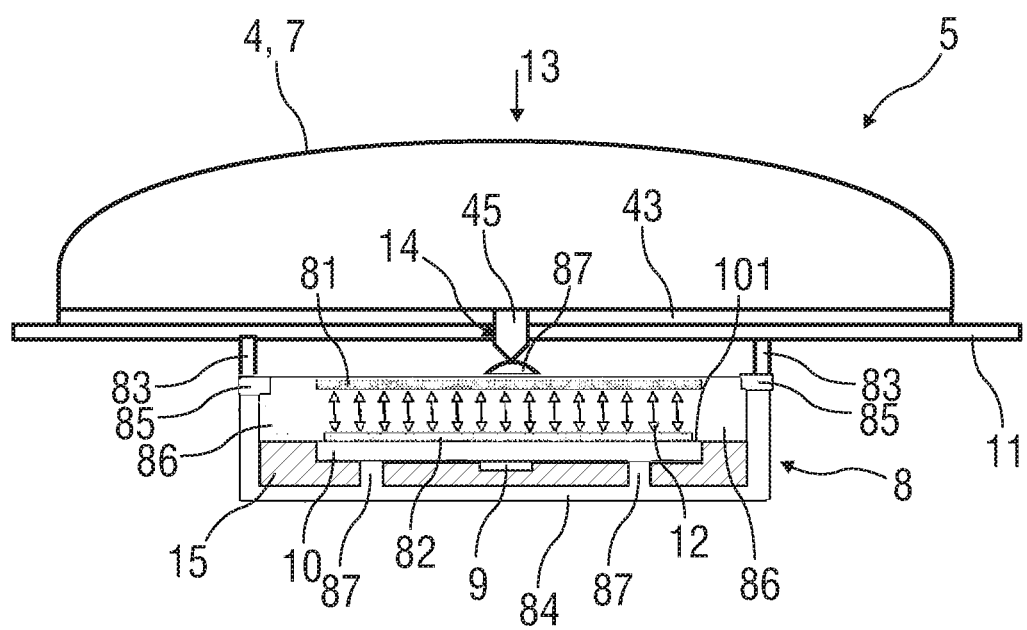
FIG. 3 shows a schematic representation of a second exemplary embodiment of a decorative element with integrated actuation module.

FIG. 3 shows a schematic representation of a second exemplary embodiment of a decorative element 4 in combination with an actuation module 5. This second exemplary embodiment differs from the first exemplary embodiment in that the actuation sensor 8 is not integrated into the decorative element 4 and is not located on the outside of the vehicle body surface 11. In this second exemplary embodiment, the actuation sensor 8 is located on the inner side of the vehicle body surface 11. The decorative element 4 acting as the actuation element 7 of the actuation module 5 is located on the outside of the vehicle body surface 11 and attached to the vehicle body surface 11 so that it can be moved, in particularly linearly, by means of the flexible element 43. The decorative element 4 acting as the actuation element 7 and the actuation sensor 8 are placed apart from each other on opposite sides of the movable vehicle element, in particular the vehicle body surface 11.

The flexible element 43 is flat in shape. For example, the flexible element 43 consists of an elastic layer made of an elastic material such as, in particular, a foam, silicon, thermoplastic elastomer, and/or thermoplastic polyurethane.

The decorative element 4, instead of the recess 44 as in FIG. 2, has a tappet 45 extending in the direction of the vehicle body surface 11. The tappet 45 extends through an opening 14 in the vehicle body surface 11 and lies on a stop 87 of the first sensor element 81 when the decorative element 4 is in a resting or initial position. The stop 87 can be configured as a bulge or a depression. In one exemplary embodiment, the lower sensor housing part 84 contains the circuit board 10 with the stops 87. The upper sensor housing part 83 is configured to be very narrow, and on its side facing the second sensor housing part 84 it has a metal surface, in particular a copper layer or metal layer, acting as the first sensor element 81.

By pressing on the decorative element 4 in the direction of the vehicle body surface 11, as shown by arrow 13, the decorative element 4 acting as an actuation element 7, and with it its tappet 45, is moved or pressed in the direction of the vehicle body surface 11 and actuation sensor 8. With a large enough actuation stroke 12 of the decorative element 4, through its tappet 45 it presses the first sensor element 81, in particular a spring plate or metal plate, in the direction of the second sensor element 82, whereby the distance to the second sensor element 82, in particular to a metal layer, for example to a copper layer on the circuit board 10, and with it the electrical field extending between them, is changed, and when the present threshold value is exceeded, an opening signal is generated and, for example, the door lock unlocks or a door movement is stopped.

The decorative element 4 with the tappet 45 and the actuation sensor 8 with the stop 87 are located and configured with respect to each other in such a way that the decorative element 4, in particular an emblem, can be pressed anywhere in order to change the distance between the two sensor elements 81 and 82. Instead of a bulge or protuberance, the stop 87 can also be a depression. For both exemplary embodiments, at least one of the two or both sensor elements 81 and 82 can be pretensioned.

According to the exemplary embodiment shown in FIG. 3, at least some sections of the circuit board 10 are covered with a suitable material 15, such as a foam and/or sealant, so that the electronics of the actuation module 5 are protected against outside influences such as water.

DRAWING REFERENCE LIST

1 Vehicle
2 Door
3 Tailgate
4 Decorative element
41 Main body
42 Fastening element
43 Flexible element
44 Recess
45 Tappet
5 Actuation module
6 Handle
7 Actuation element
8 Actuation sensor
81 First sensor element
82 Second sensor element
83 Sensor housing part
84 Sensor housing part
85 Additional flexible element
86 Interior space
87 Stop
9 Electronic evaluation unit
10 Circuit board
101 Upper surface side
11 Vehicle body surface
12 Actuation stroke
13 Arrow
14 Opening
15 Material

What is claimed is:

1. A decorative element with an actuation module for an electronic lock system, wherein the actuation module comprises at least an outer actuation element and an interior actuation sensor for triggering a switching function and an electronic evaluation unit that is connected to the actuation sensor, wherein the actuation sensor comprises a first interior sensor element and a second interior sensor element that are placed separate from and opposite to each other and between which an electrical field extends, wherein the decorative element forms the actuation element and the decorative element moves elastically when actuated so that the interior actuation sensor has force applied to it and the distance between the two sensor elements, as well as the electrical field extending between the two sensor elements, changes, and wherein the electronic evaluation unit detects the change in the electrical field and, when a threshold value is exceeded, generates a corresponding control signal to open or unlock the electronic lock system, wherein a first flexible element is arranged at least between the decorative element and at least one component of the actuating sensor, which deforms when the decorative element is actuated, wherein the first interior sensor element is connected to a first sensor housing and the second interior sensor element is connected to a second sensor housing, wherein at least one of the sensor housings, and the respective sensor element on the housing, moves relative to the other sensor housing and the other sensor element, and wherein a second flexible element is arranged between the two sensor housings.

2. The decorative element as in claim 1, wherein the decorative element itself acting as an actuation element is configured as a movable element that moves reversibly when the decorative element is actuated from an initial position to a respective actuation position.

3. The decorative element as in claim 1, wherein the outer actuation element is connected to the actuation sensor, so as to transfer the elastic movement of the outside actuation element to an actuation stroke of the actuation sensor.

4. The decorative element as in claim 3, wherein the actuation sensor is configured so that, subsequent to the applied actuation stroke, the actuation sensor generates a triggering signal or switching signal when a preset lowest actuation stroke is reached or exceeded.

5. The decorative element as in claim 1, wherein the first flexible element is located in a fastening element or between the actuation element and the fastening element.

6. The decorative element as in claim 1, wherein the actuation sensor is configured as a force-activated capacitive actuation sensor.

7. The decorative element as in claim 1, wherein the sensor elements are enclosed to the outside.

8. The decorative element as in claim 7, wherein the sensor elements are enclosed to the outside by the decorative element.

9. A movable vehicle element with a decorative element as in claim 1, wherein the actuation element and the actuation sensor are placed together on one side of the movable vehicle element or separated on opposite sides of the movable vehicle element, wherein the movable vehicle element is a vehicle body surface of the vehicle element.

10. A vehicle with at least one movable vehicle element as in claim 9.

\* \* \* \* \*